United States Patent [19]

Melbye et al.

[11] Patent Number: 5,607,635

[45] Date of Patent: Mar. 4, 1997

[54] MUSHROOM-TYPE HOOK STRIP FOR A MECHANICAL FASTENER

[75] Inventors: William L. Melbye, Maplewood; Susan K. Nestegard; Leigh E. Wood, both of Woodbury; Marvin D. Lindseth, Prescott; Dale A. Bychinski, Fairmont, all of Minn.

[73] Assignee: Minnesota Mining and Manufacturing Company, St. Paul, Minn.

[21] Appl. No.: 789,594

[22] Filed: Nov. 8, 1991

Related U.S. Application Data

[62] Division of Ser. No. 585,990, Sep. 21, 1990, Pat. No. 5,077,870.

[51] Int. Cl.$^6$ .................................................. D01D 5/20
[52] U.S. Cl. ............................................................ 264/169
[58] Field of Search .................................................. 264/167

[56] References Cited

U.S. PATENT DOCUMENTS

| | | | |
|---|---|---|---|
| 2,717,437 | 9/1955 | Mestral | 28/72 |
| 3,009,235 | 11/1961 | Mestral | 28/78 |
| 3,027,595 | 4/1962 | Takai et al. | 18/10 |
| 3,192,589 | 7/1965 | Pearson | 24/204 |
| 3,235,438 | 2/1966 | Wisotzky | 161/62 |
| 3,270,408 | 9/1966 | Nealis | 29/408 |
| 3,312,583 | 4/1967 | Rochlis | 161/62 |
| 3,408,705 | 11/1968 | Kayser et al. | 24/204 |
| 3,555,601 | 1/1971 | Price | 18/10 |
| 3,594,863 | 7/1971 | Erb | 18/5 |
| 3,594,865 | 7/1971 | Erb | 18/5 |
| 3,718,725 | 2/1973 | Hamano | 264/163 |
| 3,762,000 | 10/1973 | Meazin et al. | 24/204 |
| 4,290,174 | 9/1981 | Kalleberg | 24/204 |
| 4,315,885 | 2/1982 | Lemelson | 264/297 |
| 4,454,183 | 6/1984 | Wollman | 488/100 |
| 4,872,243 | 10/1989 | Fischer | 264/167 |

FOREIGN PATENT DOCUMENTS

| | | |
|---|---|---|
| 0324577 | 7/1989 | European Pat. Off. . |
| 0325528 | 7/1989 | European Pat. Off. . |
| 1383501 | 2/1964 | France . |
| A3244410 | 10/1983 | Germany . |
| WO87/06522 | 11/1987 | WIPO . |

OTHER PUBLICATIONS

*Injection Molding Handbook*, edited by Dominick V. Rosato et al., Van Nostrand Reinhold Co., New York: 1986, pp. 504–506, 596, 619–621, 753–756.

*Primary Examiner*—Karen Aftergut
*Attorney, Agent, or Firm*—Gary L. Griswold; Walter N. Kirn; William L. Huebsch

[57] ABSTRACT

A mushroom-type hook strip for a hook-and-loop fastener has a flexible backing of thermoplastic resin and, integral with backing, an array of upstanding stems distributed across at least one face of the backing, each having a mushroom head. The stems have a molecular orientation as evidenced by a birefringence value of at least 0.001. The mushroom-type hook strip can be produced continuously by injecting resin into cavities of a cylindrical mold while evacuating and cooling the cavities so that the cooled resin becomes molecularly oriented, thus affording to the stems excellent stiffness, durability, and tensile and flexural strength.

3 Claims, 1 Drawing Sheet

MUSHROOM-TYPE HOOK STRIP FOR A MECHANICAL FASTENER

This is a division of application Ser. No. 07/585,990 filed Sep. 21, 1990, now U.S. Pat. No. 5,077,870.

BACKGROUND OF THE INVENTION

1. Field of the Invention

The invention concerns mechanical fasteners such as hook-and-loop fasteners and is especially concerned with a mushroom-type hook strip such as can releasably close a garment, e.g., a disposable garment such as a diaper or a hospital gown. The invention also concerns mushroom-type hermaphroditic mechanical fasteners.

2. Description of the Related Art

Widely used as garment fasteners are hook-and-loop fasteners such as are currently marketed under the trademark VELCRO by Velcro USA Inc. and under the trademark SCOTCHMATE by 3M Co. As taught in U.S. Pat. Nos. 2,717,437 and 3,009,235 (both DeMestral), the hook strip can be made from special warps of upstanding nylon loop pile. One leg of each loop is cut to leave an open-ended hook, which is available to act as a fastening element.

U.S. Pat. No. 3,594,865 (Erb) of American Velcro Inc. describes injection molding techniques for manufacturing the hook strip of a hook-and-loop fastener. This, it says, provides "production rates which are faster than the weaving techniques required in U.S. Pat. Nos. 2,717,437 and 3,009,235." The Erb techniques employ a closed loop of a large number of shallow wire dies. While applying a vacuum to evacuate the wire dies, the closed loop is passed through an extruder by which molten plastic such as nylon is forced through the dies, to impregnate a fabric web immediately beneath the dies. Upon exiting from the extruder, excess resin is stripped from the surfaces of the dies to leave resilient hooks that are progressively cammed out of the dies and then spring back to provide an orderly array of hooks projecting from the plastic impregnated fabric web. Instead of using a fabric web, the apparatus can be modified to create a space beyond the wire dies into which the molten plastic can flow to form an all-plastic backing for the hooks. Another Erb U.S. Pat. No. 3,594,863 concerns similar apparatus for producing a similar hook-bearing strip. In spite of these Erb patents, the hook strips of "Velcro" hook-and-loop fasteners, as marketed today, are predominantly made by weaving techniques.

Another procedure for continuously molding a hook strip is described in U.S. Pat. No. 3,762,000 (Meazin et al.).

In U.S. Pat. No. 3,718,725 (Hamano), the hook strip of a hook-and-loop fastener is made from a fabric having an orderly array of upstanding loops. After inserting rods into rows of loops to maintain their upstanding position, platens or rollers apply heat and pressure to melt each loop at its summit and to press each free molten end to form a knob or head that can interengage with the loop strip of a hook-and-loop fastener. Because the knobs or heads afford a mushroom appearance, this type of hook fastener is called "mushroom-type".

Although a hook strip of a hook-and-loop fastener is typically sold with a cooperating loop strip, the hook strip can be used by itself to become releasably fastened to fabrics that can be easily penetrated by the hooks. Mushroom-type hook strips are particularly suited for such use. For example, mushroom-type hook strips can be designed to become releasably fastened to burlap, terry cloth, and tricot.

Mushroom-type mechanical fasteners are sometimes designed so that two hook strips can be used to fasten two articles together by adhering each strip to one of the articles and then interengaging the two strips. Such a mushroom-type mechanical fastener is shown in U.S. Pat. No. 3,192,589 (Pearson) which calls the fastener "hermaphroditic" because its headed studs have both male and female characteristics when intermeshed. The Pearson fasteners can be made by molding a base from which integral headless studs project and then heat softening the tips of the studs.

The hermaphroditic mushroom-type mechanical fastener shown in U.S. Pat. No. 4,290,174 (Kalleberg) is made with flexible, resilient, U-shaped monofilaments. The bight portion of each monofilament is embedded in a flexible bonding layer so that two stems project normally from the surface of the bonding layer. There is a mushroom head at the tip of each stem. The stems preferably are substantially uniformly spaced and of substantially equal length. Maximum disengagement force is achieved when the spacing between adjacent heads is less than their diameters and the minimum required for engagement. The monofilaments preferably are longitudinally oriented polyolefin, and the bonding layer preferably is polyolefin to permit the monofilaments to be heat fused into the bonding layer.

U.S. Pat. No. 3,408,705 (Kayser et al.) shows mushroom-type mechanical fasteners having mushroom heads of several shapes.

SUMMARY OF THE INVENTION

The invention provides a mushroom-type hook strip for a mechanical fastener such as a hook-and-loop fastener, which hook strip affords the advantages of prior mushroom-type hook strips while being less expensive to manufacture. Like prior mushroom-type hook strips, that of the invention either can be used with a loop strip or can be directly fastened to a fabric that can be penetrated by the hooks.

In another aspect of the invention, the spacing of the mushroom-type hooks can be configured such that two pieces of the hook strip interengage to provide a mechanical fastener.

Briefly, the novel mushroom-type hook strip comprises a homogeneous backing of thermoplastic resin and, integral with backing, an array of upstanding stems distributed across at least one face of the backing, each having a mushroom head, said stems having a molecular orientation as evidenced by a birefringence value of at least 0.001. In contrast, the backing of the mushroom-type hook strip of the Kalleberg patent is not homogeneous because of the bight portions of the monofilaments, even when the monofilaments and backing are identical in chemical composition and fused together.

A novel method of making the mushroom-type hook strip employs a mold which is cylindrical except being formed with cavities that are the negatives of an array of upstanding stems. The novel method involves the steps of a) rotating the mold on its axis, b) continuously evacuating air from the cavities, c) continuously injecting a molten, molecularly orientable thermoplastic resin into the evacuated cavities in excess of the amount that would fill the cavities, which excess forms a layer of resin overlying the cavities, d) continuously cooling the mold at walls of the evacuated cavities to cause the molten resin to become molecularly oriented while it is filling the cavities, e) allowing the injected resin to solidify, f) continuously stripping from the mold the solidified resin layer as a backing and integral array of upstanding stems, and g) deforming the tips of the stems to produce a mushroom head at the tip of each stem.

When the end of each of the cavities is closed, the evacuating step b) can involve the application of a vacuum so that the resin injected in step c) can substantially fill each cavity, all of which should have substantially equal depth.

When the inner end of each cavity is open, the resin injected in step c) can evacuate the cavities, but by applying a vacuum at the inner end, this should enhance the filling of the cavities. When optionally, the injected resin flows beyond the open ends of the cavities, in which case the protruding resin is skived off at the ends of the cavities before the stripping step f), thus producing stems of uniform height when the cavities are of uniform depth.

In order to afford the desired molecular orientation, the walls of the cavities should be cooled to a temperature such that the injected resin solidifies along the walls while continuing to fill the core of each cavity. After the core of a cavity has been filled, the cooling must be continued to maintain the molecular orientation and to allow the stem to be pulled from the cavity. Afterwards, it may be desirable to apply heat to the wall of the cavity before it is again injected with resin.

The cavities can be tapered to a smaller diameter in the direction of injection to facilitate removal in step f). The cavities preferably are circular in cross section and have a draft angle from 5 to 15 degrees. The draft angle is the included angle between the axis of the cavity and its wall. When the cavities have open ends, tapering is of less significance, because the stripping step f) does not need to overcome a vacuum.

Because the stems of the novel hook strip are molecularly orientated as evidenced by a birefringence value of at least 0.001, they have significantly greater stiffness and durability, as well as greater tensile and flexural strength, than would be achievable without such orientation. Because of these qualities, the stems remain erect during the deforming step g) which preferably involves the application of heat to the stem tips. Because of their molecular orientation, heating causes the tip of each stem to draw back to form a mushroom head that has a smooth, symmetrically rounded outer surface that enhances engagement and a substantially flat inner surface that enhances the holding power.

As compared to hook strips that have unoriented stems, the enhanced strength of the hooks of the novel hook strip makes them less likely to break during disengagement. When the novel hook strip is used with a loop strip, the enhanced strength of the hooks makes them less likely to break under disengagement forces than the loops, a beneficial attribute for at least two reasons. First, broken hooks can create debris whereas a broken loop does not. Furthermore, a loop strip typically contains many more loops than there are hooks per unit area, thus allowing a greater number of disengagements before a hook-and-loop fastener becomes useless.

Because of their smooth, rounded outer surfaces, the mushroom heads of the novel hook strip are user friendly and nonabrasive to the skin, thus making them ideally suited as closures for baby diapers. In such use, they are unaffected by talcum powder which can destroy the holding power of a pressure-sensitive adhesive diaper closure.

Although the stems of the novel hook strip preferably are circular in cross section, other suitable cross sections include rectangular and hexagonal. The stems preferably have fillets at their bases, both to enhance strength and stiffness and for easy release from a mold in which they are formed.

When the novel hook strip is to be used for hook-and-loop fastening, the size of the individual hooks and their spacing depends upon the fineness of the fabrics and/or loop strips with which the novel hook strip is to be used. In general, the hooks are of uniform height, preferably of from 0.5 to 5 mm, more preferably from 1 to 3 mm, and have a substantially uniform spacing of from 0.5 to 2.5 mm, center to center. Taller hooks provide better fastening, especially when used with a fabric that is not specially designed to mesh with hook strips. On the other hand, shorter hooks afford a thin profile that makes the novel hook strip less obtrusive in garment use.

For most uses, the ratio of the height of the hooks to the diameter of their stems preferably is within a range of from 2:1 to 10:1, and the ratio of the diameter of each mushroom head and its stem preferably is from 1.5:1 to 3:1. At a substantially lower diameter ratio, the hook strip might not become adequately locked to a loop strip. At a substantially higher ratio, the hooks might not penetrate easily into a loop strip or a fabric to which the novel mushroom-type strip is to be fastened.

When the novel hook strip is to be used as a hermaphroditic fastener, the height-to-diameter ratio of the hooks preferably is toward the high end of the aforementioned ratio to enhance engagement and disengagement. When the novel hook strip is to be used for hook-and-loop fastening, that ratio preferably is near its low end to afford a softer feel, especially for use in baby diapers. In garment use, a low profile is often desirable.

For most hook-and-loop uses, the hooks of the novel mushroom-type hook strip should be distributed substantially uniformly over the entire area of the hook strip, usually in a square or hexagonal array. For hermaphroditic uses, the hooks preferably are distributed to prevent lateral slippage when engaged. See, for example, coassigned U.S. Pat. No. 3,408,705 (Kayser et al.).

To have both good flexibility and strength, the backing of the novel mushroom-type hook strip preferably is from 0.1 to 0.5 mm in thickness, especially when made of polypropylene or a copolymer of polypropylene and polyethylene. For some uses, stiffer backing are preferred, e.g., up to about 5 mm in thickness.

The novel mushroom-type hook strip can be inexpensive because, using relatively inexpensive apparatus, it can be produced at higher line speeds than has been feasible for the manufacture of prior hook strips. The novel hook strip can be produced in long, wide webs that can be wound up as rolls for convenient storage and shipment. Pieces of desired lengths can be cut from a roll and adhesively or otherwise secured to articles such as a flap of a garment to permit the flap to be releasably fastened.

Virtually any orientable thermoplastic resin that is suitable for extrusion molding may be used to produce the novel mushroom-type hook strip. Thermoplastic resins that can be extrusion molded and should be useful include polyesters such as poly(ethylene terephthalate), polyamides such as nylon, poly(styrene-acrylonitrile), poly(acrylonitrile-butadiene-styrene), polyolefins such as polypropylene, and plasticized polyvinyl chloride. A preferred thermoplastic resin is a random copolymer of polypropylene and polyethylene containing 4% polyethylene and having a melt flow index of 7.0, available as WRS-6-165 from Shell Oil Company, Houston, Tex.

BRIEF DESCRIPTION OF THE DRAWING

The invention may be more easily understood in reference to the drawing, all figures of which are schematic. In the drawing.

DETAILED DESCRIPTION OF THE INVENTION

Figure 1:
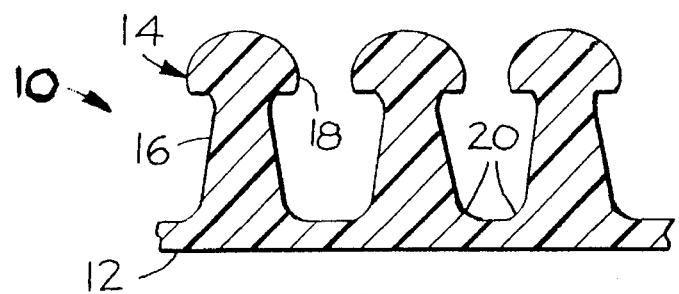
FIG. 1 is a cross section through a mushroom-type hook strip of the invention.
Figure 2:
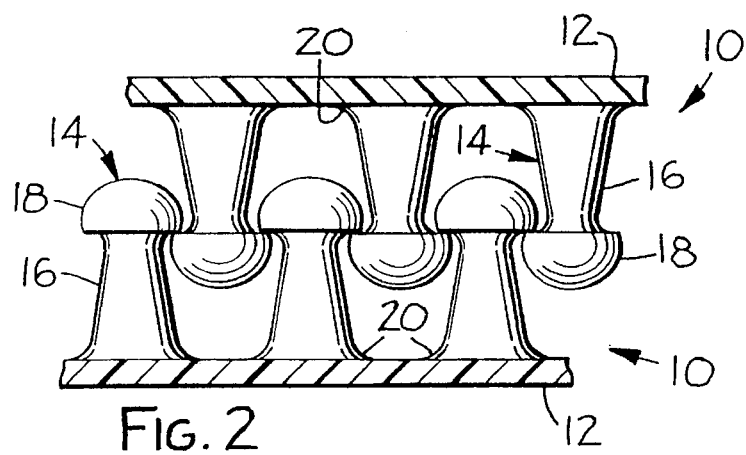
FIG. 2 is a cross section of interengaging pieces of the hook strip of FIG. 1.

The hook strip 10 shown in FIG. 1 has a substantially continuous backing 12 of thermoplastic resin. Integral with the backing is an array of mushroom-shaped projections or hooks 14, each having a molecularly oriented stem 16, a mushroom head 18, and a fillet 20 at the base of the stem. A piece of the hook strip 10 can be the hook portion of a hook-and-loop mechanical fastener, or it can be releasably fastened to a fabric which is penetratable by the mushroom-shaped hooks 14, or it can be configured such that two pieces of the hook strip 10 can be interengaged to form a hermaphroditic mechanical fastener as shown in FIG. 2.

Figure 3A:
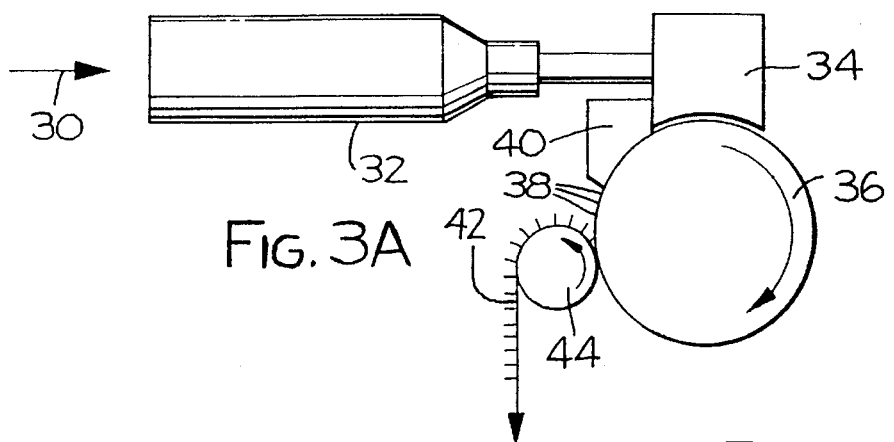
FIGS. 3A & 3B diagram a method of making the hook strip of FIGS. 1 and 2.

In FIG. 3A a feed stream 30 of thermoplastic resin is fed into an extruder 32 from which a heated resin melt is fed through a die 34 to a rotating cylindrical mold 36. Cavities 38 in the cylindrical surface of the mold 36 are evacuated by an external vacuum-system 40. The die 34 has an output radius equal to that of the mold 36 in order to provide a seal between the die and the mold. Rapid flow of the resin into the mold cavities 38 induces molecular orientation parallel to the direction of flow, and the mold is water-cooled (cooling means not shown) to provide rapid quenching to freeze this orientation in place. The solidified resin is stripped from the mold 36 by a stripper roll 44 as a web 42 that has an array of upstanding stems 48. This web can either be wound into a roll for storage or fed directly into the mushroom forming apparatus of FIG. 3B.

Figure 3B:
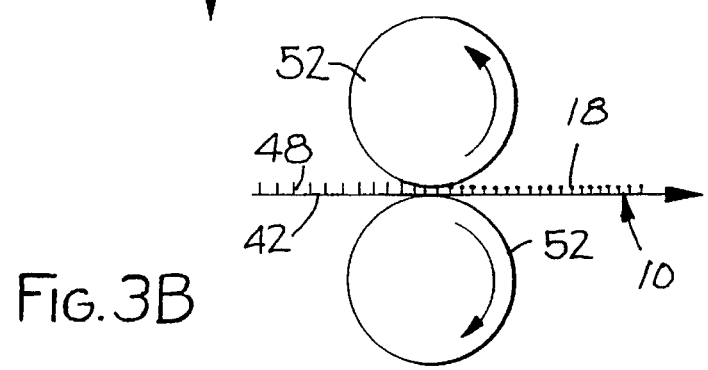

In FIG. 3B, the web 42 is fed between two calendar rolls 52, and the roll that contacts the stems 48 heats the tips of the stems to a temperature exceeding the flow point of the thermoplastic resin. Briefly, maintaining the tips at this temperature allows molecular disorientation to take place. During this time and upon subsequent cooling, the tips draw back to form uniformly shaped mushroom heads 14 as shown in FIG. 1, each having an upper, substantially convex surface and a larger cross section than the original stem 48.

TESTING

Birefringence

Birefringence can be measured by any of several different optical techniques, such as by using standard fluids with different indices of refraction, the Becke line technique, dispersion staining, or a compensator. The compensator technique is used to obtain the birefringence measurements reported below.

Using an "Ortholux 2 Pol" polarized light microscope with a Berek compensator from E. Leitz Company, Covington, Ky., a hook strip is placed under crossed polarized light with its z-axis oriented north-south. The microscope stage is rotated 45 degrees. A compensator is rotated in each direction until a black fringe appears; at this point retardations are equal and opposite. Compensator readings are recorded and the birefringence of the sample is calculated according to the equation:

$$B = R \times C / t$$

where R=retardation, C=compensator constant, and t=sample thickness. The retardation R, is defined as the phase difference between the two components in numbers of waves.

Break Force

The "Break Force" of a hook of a novel mushroom-type hook strip can be measured using an Instron Model 1122 tensile tester. The hook strip is folded in half, thus exposing one row of mushroom heads. The folded web is placed in the lower grips of the tensile tester with the stems of the exposed mushroom heads extending in a vertical direction. One end of a nylon thread is looped around one of the exposed mushroom heads, and the other end is secured to a 500 gram loadcell. The crossbar holding the loadcell is then moved in an upward direction at a rate of 12.7 mm per minute.

Shear Strength

The shear strength of the hooks of a mushroom-type hook strip can be measured using a tensile tester (Instron Model 1122) equipped with a "CT" load cell. The hook strip to be tested and a mating loop strip of a hook-and-loop fastener are each cut to a length of 102 mm and a width was 51 mm. The mating loop strip can be SCOTCHMATE™ woven loop, Style No. SJ 3401 from 3M Co. The samples are conditioned under a bell jar by immersion for 24 hours in water supersaturated with magnesium acetate. The conditions under the jar are 21° C. (±1° C.) and 65% (±2%) relative humidity. The loop strip is laid loop side up on a flat surface and adhered to the surface by pressure-sensitive adhesive tape. The hook strip is intermeshed with the loop strip, and a roller weighing 5 kg is rolled over the back of the hook strip three times in each direction at a rate of 305 mm/min. The sample is placed in the jaws of the tensile tester with a free end of the hook strip gripped in the upper jaws and a free end of loop strip gripped in the lower jaws with the shear line centered. At a crosshead speed of 305 mm/min, a pen and chart records the maximum value obtained during the complete separation. Four specimens are tested, and an average is taken.

T-peel

A mushroom-type hook strip and a mating loop strip of a hook-and-loop fastener are each cut to 178 mm in length and 51 mm in width. The strips are then conditioned for 24 hours under a bell jar by immersion in a supersaturated solution of magnesium acetate and water for 24 hours at 21.1° C. (±1.1° C.) and 65% (±2%) relative humidity. The hook strip is then carefully aligned with the loop strip and intermeshed with light finger pressure. The loop strip can be SCOTCHMATE™ woven loop, Style No. SJ 3401 from 3M Co. A roller weighing 5 kg and 76 mm in width is rolled over the strips making three passes in each direction at a rate of 305 mm/min. At one end, the strips are peeled apart to free approximately 70 mm in the lengthwise direction. The freed end of the hook strip is gripped in the upper jaws of a tensile tester (Instron Model 1122) and the freed end of the loop strip is gripped in the lower jaws. The tensile tester has a "CT" loadcell and a 305 mm/min crosshead speed. The gauge length is 6.2 mm (±3.2 mm), and the load range is 44.5N for a full scale load. The peel distance is 76.22 mm. Six specimens are tested with three specimens having their marked ends at corresponding ends of the specimen and three specimens having their marked ends at opposite ends of the specimen. The peaks are recorded, with the first peak being ignored and the remaining five largest peaks being averaged to provide the "T-peel Strength".

The invention will be more readily understood by the following examples.

Example 1

To make apparatus as illustrated in FIG. 3A, mold cavities 38 were formed in the cylindrical face of a steel mold 36 by drilling a series of frustro-conical holes using bits having a tip width of 0.15 mm and a draft angle of 6 degrees. The resulting square array of holes had a uniform depth of 1.27 mm and uniform center-to-center hole spacing of 1.27 mm.

While maintaining a vacuum at 46.8 mm of mercury and cooling the mold 36 internally with water at 35° C. low density polyethylene 1017 from Norchem, Rolling Meadows, Ill., was extruded at a temperature of 235° C. into the cavities while rotating the mold at a surface speed of 7.7 m/min. The thickness of the layer of resin overlying the cavities was 0.2 mm. The solidified resin was stripped from the mold as a web having upstanding stems.

Using apparatus as illustrated in FIG. 3B, the web was run through a gap between two calender rolls 52 at a linespeed of 3.7 m/min while maintaining the top roll at 130° C. and the gap between the two rolls 52 at 0.9 mm. This produced a mushroom-type hook strip as illustrated in FIG. 1, which hook strip showed good engagement with typical knitted and stitchbonded loop systems. The stems of the hooks, as measured using photomicrographic analysis, exhibited a birefringence value of 0.003. The mushroom heads were about 0.8 mm in diameter.

The mushroom-type hook strip was tested in comparison to a hook strip made as described in Comparative Example A.

Comparative Example A

A mold was made by drilling a metal plate with bits as described in Example 1 to form a series of frustro-conical holes similar to the array of holes of Example 1. While maintaining a vacuum, a 0.2 mm sheet of the polyethylene resin of Example 1 was compressed at a temperature of 235° C. into the array of holes. After cooling the mold with water to solidify the resin, the sheet which was stripped away had upstanding stems similar in appearance to those of the web that had been stripped from the cylindrical mold in Example 1.

When the sheet was run through a gap between calendar rolls 52 as in Example 1, the tips of the stems formed nondescript heads which were of less uniform shape than were the mushrooom heads produced in Example 1.

Comparative testing is reported in Table I.

TABLE I

|  | Birefringence | Break Force (N) |
|---|---|---|
| Example 1 | 0.003 | 1.46 |
| Comparative A | 0.000 | 0.85 |

The hook strip of Example 1 was also tested with two different loop strips as reported in Table II.

TABLE II

|  | Shear Strength (N/cm) | T-Peel (N/cm) |
|---|---|---|
| With SCOTCHMATE ™ Woven loop Style No. SJ 3401 | 83.1 | 1.225 |
| With SCOTCHMATE ™ tricot knit loop Style No. SJ 3491 | 86.6 | 0.61 |

What is claimed is:

1. A method of making a mushroom-type hook strip that can be used in a hook-and-loop mechanical fastener, which method uses a mold that is cylindrical and has cavities that are the negatives of an array of only upstanding stems, said method comprising the steps of a) rotating the mold on its axis, b) continuously evacuating air from the cavities, c) continuously injecting a molten, molecularly orientable thermoplastic resin into the evacuated cavities in excess of the amount that would fill the cavities, which excess forms a layer of resin overlying the cavities, d) continuously cooling the mold at the walls of the evacuated cavities to cause the molten resin to become molecularly oriented while it is filling the cavities as evidenced by a birefringence value of at least 0.001 in the solidified resin after it is removed from the cavities, e) allowing the injected resin to solidify, f) continuously stripping from the mold the solidified resin layer as a backing and integral array of upstanding stems having tips at their ends opposite the backing, and g) deforming the tips of the stems by applying heat to the tips of the stems to produce mushroom heads at the ends of the stems opposite the backing.

2. A method as defined in claim 1 wherein said continuously evacuating step involves applying a vacuum to evacuate air from the cavities.

3. A method as defined in claim 1 wherein the inner end of each of the cavities is open, the resin injected in said continuously injecting step protrudes beyond the ends of the cavities, and said method further comprising a step prior to said continuously stripping step of skiving off solidified resin that has flowed beyond the inner ends of the cavities.

\* \* \* \* \*